United States Patent [19]

Albright

[11] 4,050,488

[45] Sept. 27, 1977

[54] CAM ACTUATED TREE CUTTING SHEARS AND BUNCHER

[76] Inventor: Alva Z. Albright, 2909 Monroe Highway, Pineville, La. 71360

[21] Appl. No.: 679,524

[22] Filed: Apr. 23, 1976

[51] Int. Cl.² .................................................. A01G 23/08
[52] U.S. Cl. .............................. 144/309 AC; 144/3 D; 144/34 E
[58] Field of Search ............... 37/2 R; 144/3 D, 34 B, 144/34 E, 309 AC; 83/928, 693

[56] References Cited

U.S. PATENT DOCUMENTS

| | | | |
|---|---|---|---|
| 2,529,934 | 11/1950 | Gracey et al. | 144/34 E |
| 3,807,472 | 4/1974 | Propst et al. | 144/34 E |
| 3,848,648 | 11/1974 | Dika et al. | 144/34 E X |
| 3,911,981 | 10/1975 | Tucek | 144/34 E |

*Primary Examiner*—Othell M. Simpson
*Assistant Examiner*—W. D. Bray
*Attorney, Agent, or Firm*—James B. Lake, Jr.

[57] ABSTRACT

Shear knives are pivoted, side by side with sharp edges opposed, by a pair of adjacent ends to a pivot strap. Cam rollers are mounted respectively for rotation on the knives at the junctions of their free ends and outboard sides. Rearwardly converging cam edges are mounted in forwardly extending arms of a forwardly movable frame, and arms being adapted to receive the pivot strap transversely therebetween and a tree of not over an equal diameter. The knives are slidably mounted in slots in the respective arms with their free ends forward and their roller cam followers respectively engaging the converging cam edges on which they are spring biased forwardly. The knives are cammed closed to cut a tree as the movable frame moves forwardly relative to tree and knives. A swinging member, having a transverse blade pivoted to the top thereof, is itself pivoted to one of the pair of arms and is hydraulically actuated to swing past a cut tree between the arms and back to raise the tree clear of the shear knives and onto a raised floor rearwardly and hold it there. A second pair of arms vertically spaced above the first pair also receives the tree which is releasably retained therebetween by a one-way pair of gates at the ends thereof.

5 Claims, 6 Drawing Figures

CAM ACTUATED TREE CUTTING SHEARS AND BUNCHER

BACKGROUND OF THE INVENTION

1. Field of the Invention

The invention relates generally to apparatus for harvesting tree, and more particularly to shear cutting trees and bunching them.

2. Description of the Prior Art

Heretofore shear cutting trees has employed a fixed knife for pushing against trees at various angles, or a movable knife in combination with a usually stationary reaction member. The first type of shear cutting has the advantage of continuous forward motion but requires great tractive force and is the most damaging to the trees cut. The second type of shear cutting requires the apparatus to stop while cutting is in progress. The last type is slow but damages the trees much less than first type, and the cutting is accomplished hydraulically rather than through traction.

SUMMARY OF THE INVENTION

It is an object of the invention to provide shears that will cut as fast as the fixed knive and with tree damage comparable with results obtained by the movable knife and reaction member.

Another object of the invention is to mechanically multiply tractive and inertial forces as they are transmitted into cam operated shear knives and thereby require the use of lighter and less powerful power trains than is required by the fixed type of shear.

Another object of the invention is to provide a buncher suitable for use with the sears of the invention.

A further object of the invention is to provide a tree harvester in which tree cutting and accumulating sequences are automatically coordinated and continuous, and bunching is accomplished as necessary.

DETAILED DESCRIPTION OF THE INVENTION

The invention is for use with a power train having a double auxiliary hydraulic power supply.

Figure 1:
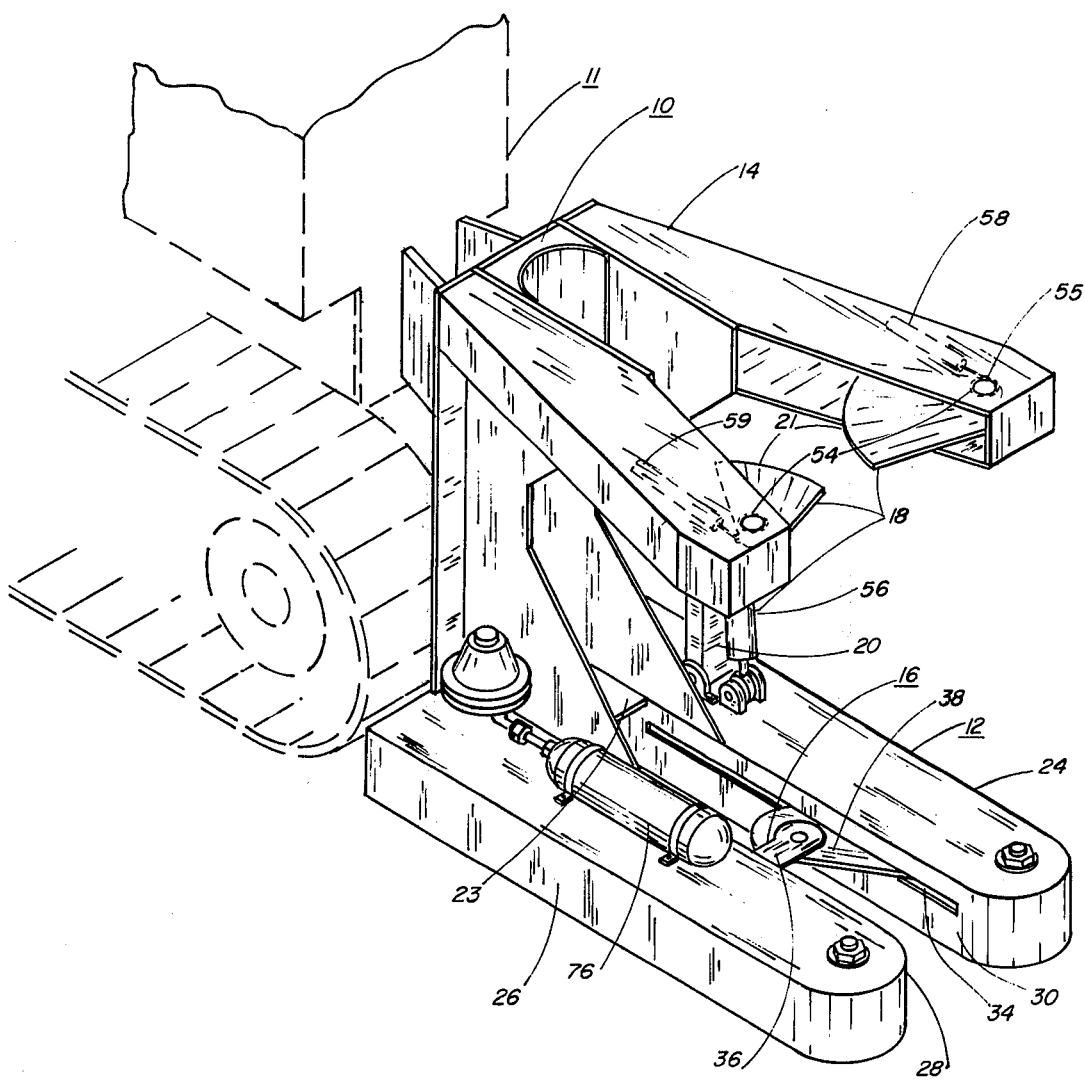
FIG. 1 is a three dimensional view from above and forward of the apparatus showing it relative to a partially indicated power train.
Figure 2:
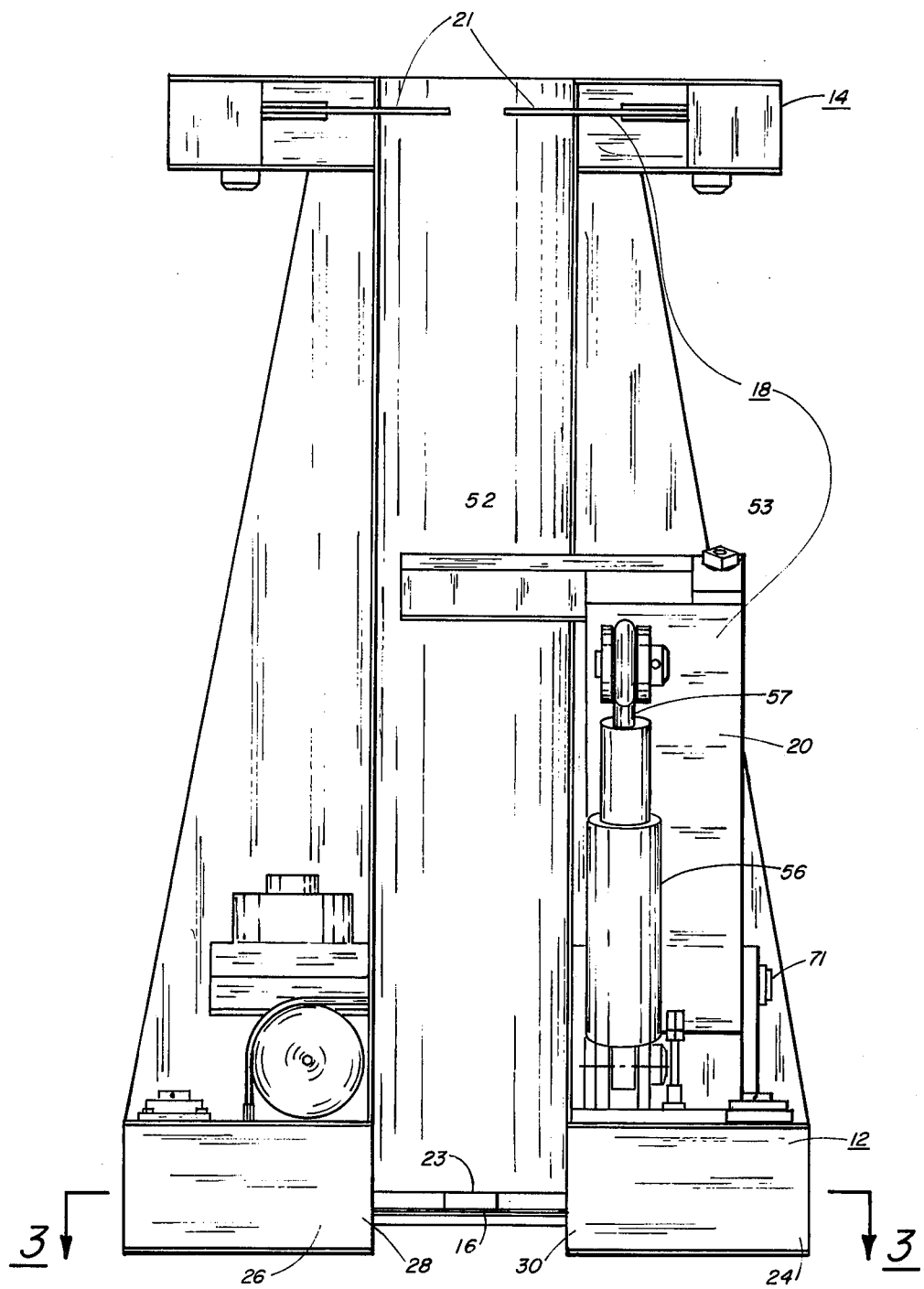
FIG. 2 is a front view of the invention.
Figure 3:
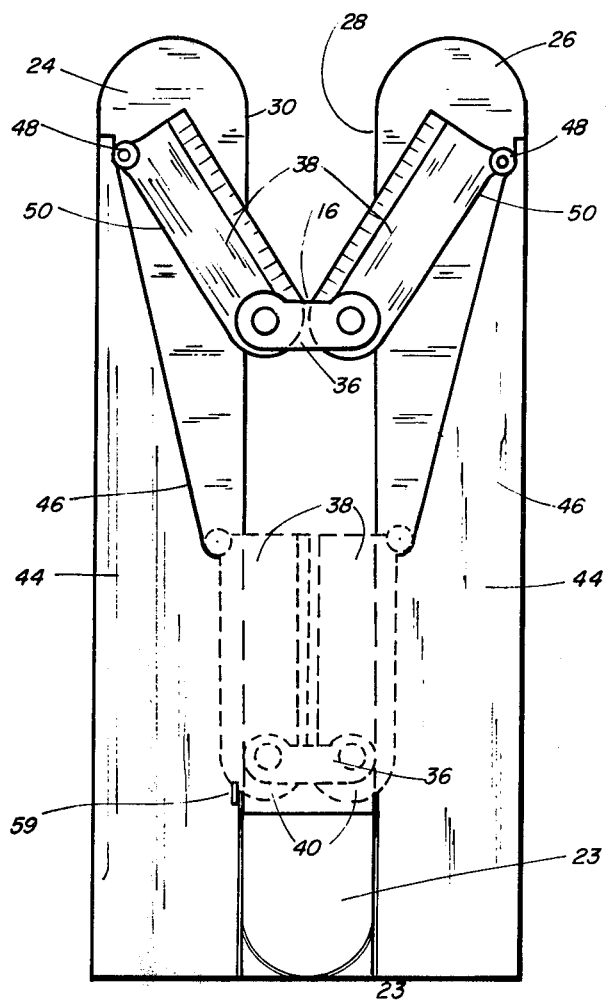
FIG. 3 is a cross-sectional view taken along section lines 3—3 of FIG. 2.

Referring to FIGS. 1-3, the invention comprises a vertical frame 10 having rearwardly extending connecting means (not shown) for connecting it to the front of a power train 11 (partially shown in FIG. 1), and having two pairs of forwardly extending arms 12 and 14 spaced vertically apart in pairs. A pair of shears 16 is movably mounted in and between the lower of the two pairs of arms, that is pair 12. A tree accumulating apparatus includes a swinging member 20 mounted on one of the pair of arms 12, operates in cooperation with inward opening gates 21, spring loaded outwardly, that are mounted on the forward ends of pair of arms 14. An hydraulic power and control apparatus 22 (see FIG. 6) is mounted on frame 10 and power train 11 for operating the tree accumulating apparatus.

Referring to FIGS. 1-3, in frame 10 a raised floor 23 extends between pair of arms 12 rearwardly of shears 16 limit of rearward travel relative to frame 10 for receiving cut trees and to pass over the stumps thereof. Pair of arms 12 comprise two elongated hollow members 24 and 26 spaced horizontally apart and with opposing sides 28 and 30 defining parallel slots 32 and 34 respectively. Cams 44 define cam edges 46 and are respectively mounted in pair of arms 12 to converge rearwardly and opposite their respectively adjacent slots 32 and 34.

Figure 5:
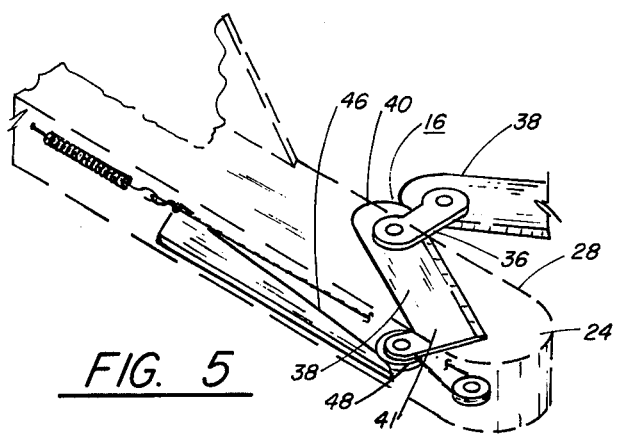
FIG. 5 is a three dimensional partially cutaway view showing spring loading of the shears.

Referring to FIGS. 1, 3 and 5, shears 16 comprise a pivot strap 36 having oppositely disposed ends to which are pivoted knives 38 by their ends 40, the knives being positioned side by side with sharp edges opposed. Roller cam followers 48 are mounted for rotation on the free ends of knives 38 adjacent dull edges 50. Pivot strap 36 is mounted between pair of arms 12 with knives 38 slidably extending respectively through slots 32 and 34, and free ends 41 extending forwardly for cam followers 48 to rollably engage cam edges 46. Slots 32 and 34 are too narrow to admit pivot strap 36 which is thereby kept centered between pair of arms 12.

Figure 4:
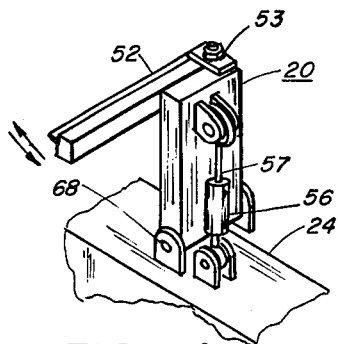
FIG. 4 is a partial three dimensional view of a part of the tree accumulating apparatus.

Referring to FIGS. 1, 2 and 4, tree accumulating device comprises a swinging member 20 which is pivoted to the top of arm 24 of pair of arms 12 for swinging forwardly from vertical to horizontal and back. A blade 52, spring biased by a flat spiral or coil spring 53 to extend transversely toward arm 26 of pair of arms 12, is pivoted to the top of swinging member 20 with its sharp edge facing rearwardly. Blade 52 is free to pivot rearwardly against spring loading as member 20 swings past a tree to a horizontal position and to return to its transverse position locked against pivoting forwardly to bite into the tree as member 20 returns to vertical position. The cut tree is carried upward and rearward thereby and deposited on raised floor 23, the upper part of the tree passing through gates 21 and between pair of arms 14. Gates 21 are pivoted to swing rearward for admitting trees and are spring loaded to close to prevent inadvertent loss. Coil springs 54 mounted around pivots 55 of gates 21 spring load the gates from opening until overridden by the entrance of a tree or hydraulically by the operator to drop the trees at a bunching area.

Referring to FIGS. 1, 2, 4 and 6, hydraulic power and control apparatus 22 comprises an hydraulic cylinder 56 which is pivotally mounted on arm 24 adjacent swinging member 20, with said cylinder's piston 57 pivoted to the top of member 20. Two smaller hydraulic cylinders 58 and 59 are mounted one in each of the arms of pair of arms 14, and operatively connected to gates 21 for overriding coil springs 54. Except for the manual control for opening gates 21, the operation of the shears 16 and the accumulating apparatus 18 is automatic and coordinated as described hereinafter.

The description of the valves and other apparatus in the hydraulic system will be combined with a description of the operation of the invention.

Figure 6:
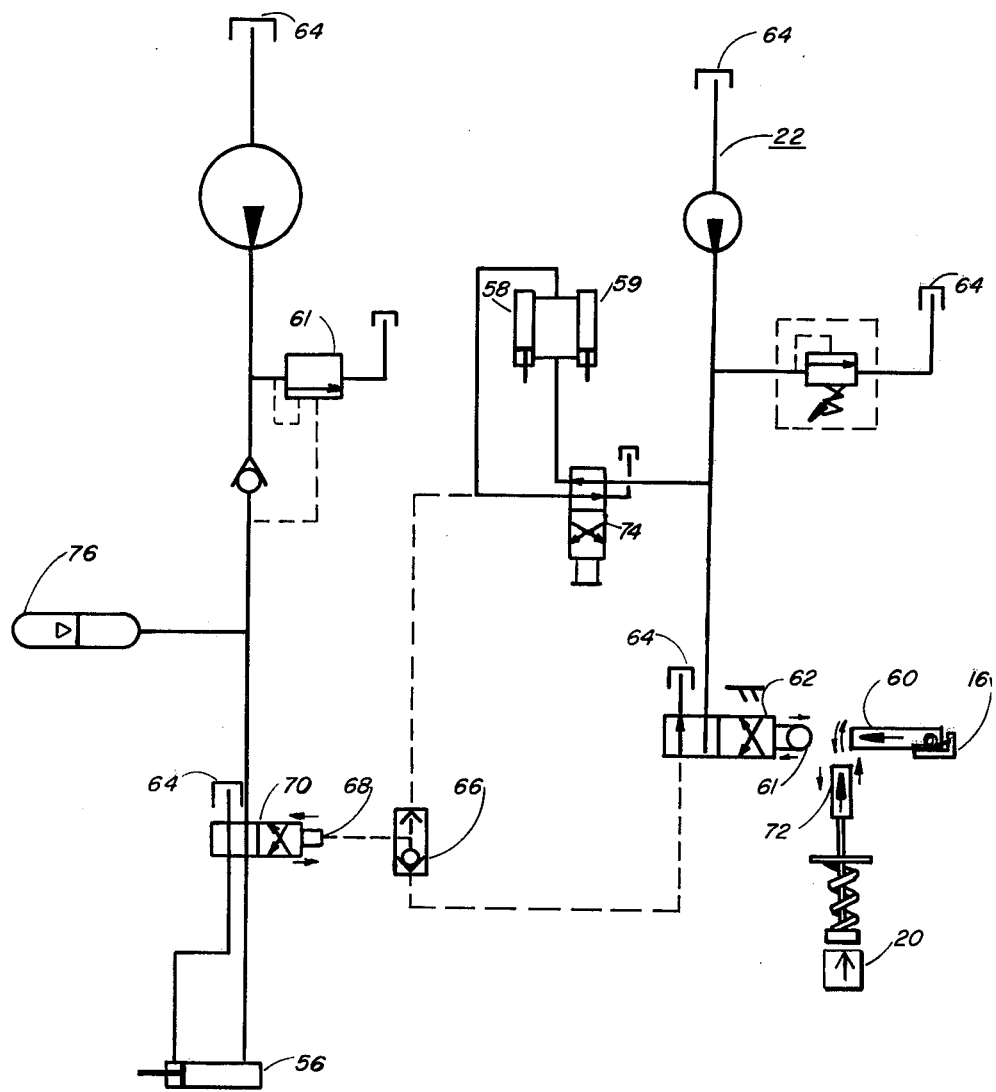
FIG. 6 is a diagrammatical sketch of the hydraulic power and control system of the invention.

In use the invention is fixed to the front end of a power train as shown in FIG. 1 and is directed to a tree for cutting. The tree is received between arms 24 and 26 of the pair of arms 12. Swinging member 20 of the accumulating apparatus 18 is in a vertical position, and shears 16 are biased to a forward position between arms 24 and 26 and converging cams 46 at their widest divergence. As the tree enters between arms 24 and 26 it contacts the sharp edges of knives 38 of shears 16. As the invention continues to move forward, shears 16 is stopped by the tree but as the frame 10 and arms 24 and 26 continue forwardly both the tree and the shears are moved relatively rearward. Roller cam followers 48, engaging converging cam edges 46, close knives 38 to cut tree. Referring to FIG. 6, shears 16 as they approach raised floor 23 at the converging ends of cam edges 46 engages by means of a valve actuator 60 pivoted to back of shears 16 a valve stem 61 of a fourway two position valve 62 to open one of its two positions to pressure flow and returning the other second position to hydraulic reservoir 64. Flow thru valve 62 goes to a shuttle valve 66 and then to a pilot actuator 68 on a four way two position slave valve 70. This causes slave valve 70 to deliver hydraulic flow to the rod end of hydraulic cylinder 56 pivoted to swinging member 20, the other end of cylinder 56 is opened to reservoir 64. Cylinder 56 retracts and moves member 20 forward and down about it pivot 71 (see FIG. 2) pas the cut tree, the pivoted blade 52 striking the tree and pivot rearward and then return to lock behind the tree. As member 20 reaches the limit of its travel, it strikes a spring loaded plunger 72 that engages and pivots valve actuator 60 clear of valve stem 61, thereby stopping pilot flow through valve 62 to dead-end. Slave valve 70, losing pilot line pressure is shifted by spring loading to return to its original position directing flow of hydraulic pressure to the cylinder end of cylinder 56 and connecting its rod end to reservoir 64. This causes swinging member 20 to rise and move rearward engaging the cut tree with the sharp edge of blade 52 to lift it from shears 16 and carry it rearward to raised floor 23 and hold it there. Shears 16 being cleared cleared of the cut tree is biased forward preparatory to engaging another tree, the stump of the cut tree passing under raised floor 23. The forward motion of frame 10 and the arms 12 also brings the cut tree between the forwardly extending pair of arms 14, the gates 19 swinging aside to let said tree enter and close behind it.

The invention is unloaded by tilting it forward on the power train, opening gates 21, and swinging swinging member 20 downward to allow the trees to fall out in a pile. This is accomplished manually by operating operator's valve 74 by directing pressure flow simultaneously to slave valve 70 and cylinders 58 and 59 to open gates 21.

A pressure accumulator 76 is mounted on arm 26 and connected to the double auxiliary hydraulic power system of the power train 11 and provides immediate hydraulic power to operate the invention's hydraulic cylinder through it rather directly from the auxiliary system.

What is claimed is:

1. Cam actuated tree cutting shears for continuously and automatically shearing and accumulating trees for bunching, in combination with a power train having an auxilliary hydraulic power system and a forward lift, comprising:
   a. frame means having rear connections connecting it to said forward lift for moving and tilting said frame means for bunching, said frame means also having forwardly extending upper and lower pairs of arm means for receiving trees therebetween, and having raised floor means positioned rearwardly and between said lower pair of arm means;
   b. openable and closable shear means mounted for forward and rearward motion in and between said lower pair of arm means;
   c. camming means mounted rigidly in said lower pair of arms and a rotatably mounted follower means on said shear means for opening said shear means in said forward movement and closing said shear means in said rearward movement; and
   d. hydraulically operable tree accumulating means for automatically engaging and lifting cut trees off said shear means and onto said raised floor means and for storing said cut trees thereon and between said upper pair of arms means.

2. Cam actuated tree cutting shears as described in claim 1 wherein said openable and closable shear means comprises:
   a. a transverse pivot strap with oppositely disposed ends for mounting transversely between said lower pair of arm means;
   b. a pair of elongated knives, each having sharp edges disposed thereon, said knives being pivoted by respective ends, with said sharp edges being opposed, to oppositely disposed ends of said pivot strap.

3. Cam operated tree cutting shears as described in claim 1 wherein said camming means comprises:
   a. a double cam defining rearwardly converging cam edges mounted respectively in said lower pair of arm means; and
   b. a pair of roller cam followers, each respectively mounted on free ends of said shear means for rollably engaging said cam edges respectively.

4. Cam operated tree cutting shears as described in claim 1 wherein said hydraulically operable tree accumulating means comprise:
   a. a swinging member pivoted adjacent said raised floor means to an arm of said lower pair of arm means, said member being adapted to swing from a vertical position forward and downward to a horizontal position;
   b. a blade, having a sharp edge, pivoted to a free end of said swinging member with said sharp edge extending rearwardly and transversely between said lower pair of arm means, said blade being adapted to pivot rearwardly when swung forwardly and downwardly past a cut tree and to engage said tree with its sharp edge when swung rearwardly and upwardly;
   c. an hydraulic cylinder pivoted by its cylinder end adjacent said swinging member and with its rod end pivoted to the top of said swinging member below said pivoted blade, and adapted to pivot said swinging member between vertical and horizontal positions;
   d. a pair of gates pivoted to the ends of said upper pair of arm means adapted to swing inward only against an outward bias;
   e. a pair of hydraulic cylinders pivoted between respective arms of said upper pair of arm means and said gates for overriding said bias to open said gates for releasing accumulated trees for bunching; and
   f. hydraulic conduits and control valves mounted in said frame means for connecting said cylinders to said auxilliary hydraulic power system of said power train and for initiating the action of said cylinders by the operation of said cam operated shears.

5. Method of shearing and accumulating trees comprising the steps of:
   a. slidably mounting shears in a frame, said frame having a forward open end and a rearward end, said shears having pivoted ends disposed rearwardly in said frame and free ends disposed forwardly in said frame;
   b. camming said shears closed by the cooperation of converging cams mounted rigidly in said frame engaging cam followers mounted onn the free ends of said shears;
   c. actuating said camming of said shears by introducing a tree end between said open end of said frame and by advancing said frame forwardly;
   d. raising said cut tree clear of said shears and accumulating them in said frame;
   e. spring biasing said shears forwardly and open for engaging another tree therebetween; and
   f. bunching said cut and accumulated trees by tilting said frame forward.

* * * * *